Jan. 17, 1967 W. C. BUBNIAK 3,298,429
ROTARY REGENERATOR SEAL
Filed Aug. 2, 1965

INVENTOR.
William C. Bubniak
BY
Paul Fitzpatrick
ATTORNEY

United States Patent Office 3,298,429
Patented Jan. 17, 1967

3,298,429
ROTARY REGENERATOR SEAL
William C. Bubniak, Warren, Mich., assignor to General Motors Corporation, Detroit, Mich., a corporation of Delaware
Filed Aug. 2, 1965, Ser. No. 476,426
2 Claims. (Cl. 165—9)

My invention is directed to rotary regenerators and particularly to the diaphragm seals of such devices. A rotary regenerator is a heat exchange device in which a porous matrix is rotated slowly so that each part of the matrix passes alternately through a stream of hot gas and a stream of cool gas, absorbing heat from the hot gas and delivering it to the cool gas. The gas may flow parallel to or perpendicular to the axis of rotation. In the preferred embodiment of the invention described herein the regenerator is of the radial flow type, also called drum type.

In such regenerators, a diaphragm separates the chambers through which the two streams of fluid pass. It is necessary to minimize leakage from one chamber to the other past the bulkhead, and therefore a seal called a main or diaphragm seal is provided encircling the matrix where it passes through the diaphragm. More specifically, the main seal may include a primary seal which seals against the matrix and a secondary seal which seals between the primary seal and the diaphragm. Because of thermal expansion and possible warping of the parts the primary seal ordinarily needs to float to some extent in the housing of the regenerator.

Sealing between the diaphragm and the matrix is difficult because, with gas flowing from one face of the matrix to the other (whether radially or axially) there is a temperature gradient from one face to the other and the matrix distorts, the hot face becoming convex and the cooler face concave. The matrix ordinarily includes two rings or rims which define the edges of the gas flow path and retain the porous material which transfers the heat. The main seal ordinarily seals in the manner of a labyrinth seal against the porous material of the matrix but may best have a sliding contact against the rims of the matrix. Because of relative thermal expansion of the parts and also wear of the seals, the primary seal ordinarily includes a movably mounted spring-biased end block riding against at least one rim of the matrix.

My invention is an improvement over the prior art seals of which I am aware, such as that disclosed and claimed in U.S. Patent No. 3,057,604 for Rotary Regenerator of Bubniak et al., issued October 9, 1962, and that disclosed in U.S. Patent No. 3,077,074 for Regenerative Gas Turbines of Collman et al., issued February 12, 1963. The main seals disclosed in these patents include a primary seal fitting closely around the matrix and a secondary seal which is essentially a rectangular frame of thin sheet metal bridging the gap between the primary seal and the diaphragm. The secondary seal engages in narrow slots or saw cuts in the structure of the primary seal and diaphragm. It is not effective to seal between the relatively movable end block and the frame of the primary seal. According to my present invention, the secondary seal is in direct sealing relation to the shiftable end block of the primary seal, thus eliminating one leakage path and increasing the sealing efficiency of the main seal.

The nature of my invention and the advantages thereof will be clear to those skilled in the art from the succeeding detailed description of the preferred embodiment of the invention and the accompanying drawings thereof.

Figure 1:
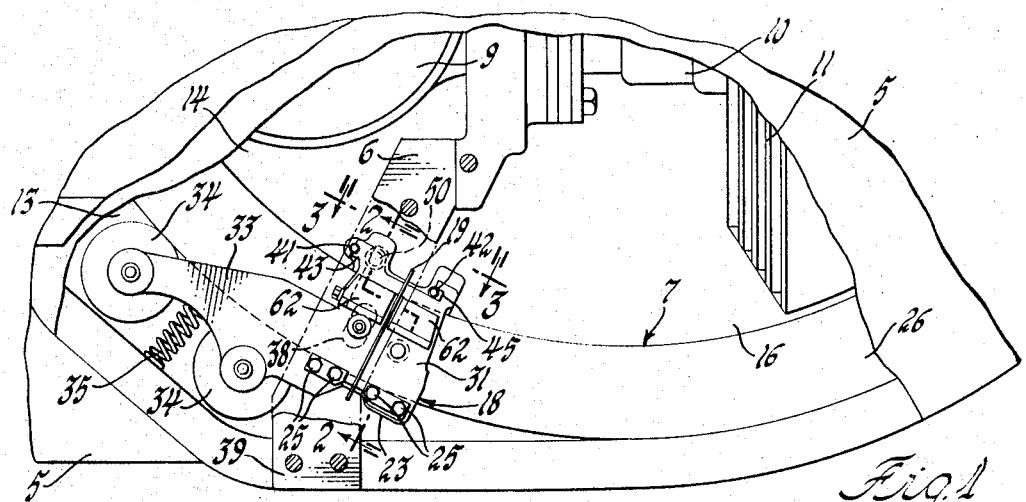
FIGURE 1 is a partial view of a regenerative gas turbine engine taken on a plane perpendicular to the axis of a drum regenerator with parts cut away and in section.

Referring first to FIGURE 1, the invention is illustrated as incorporated in a regenerative gas turbine engine of the type shown in U.S. Patent No. 3,057,604 modified to include a guiding roller structure for the main seal of the type shown in U.S. Patent No. 3,077,074. In view of the background information available in these patents, there is no need to describe the engine or the over-all regenerator to explain my present improvement in the main seal.

FIGURE 1 illustrates a portion of the engine case or housing 5 which also is the regenerator housing, a diaphragm 6, and a drum type regenerator matrix 7. It also illustrates a portion of the combustion apparatus 9 of the engine which discharges motive fluid into a turbine 10 mounted in the diaphragm 6. The turbine exhausts through a diffuser 11 into a hot gas space 16 within the matrix and to the rear of the diaphragm. The turbine drives a compressor (not shown) which delivers air to a cold air space 13 exterior to the matrix and forward of the diaphragm from which it flows through the matrix to a hot air space 14 within which the combustion apparatus is mounted. The turbine exhaust flows outwardly through the matrix into the housing and is discharged through a suitable exhaust port (not shown). The means for supporting the matrix and rotating it about its axis are not illustrated, it being understood that the matrix is rotated at a rather slow rate such as 30 revolutions per minute. Since there is a pressure difference between the spaces 14 and 16 equal to the pressure drop across the turbines, there may be a 40 or 50 pound per square inch pressure drop tending to cause leakage where the matrix 7 passes through the diaphragm. The main seal which is provided to minimize such leakage comprises a primary seal 18, which is a rectangular frame disposed closely around the matrix, and a secondary seal 19, which is a frame of thin sheet metal bridging the gap between the primary seal 18 and the diaphragm.

The primary seal 18 comprises a seal bar 21 extending across the outer or cooler face of the matrix, a seal bar 22 extending across the inner or hot face of the matrix and end plates 23 adjacent each rim of the matrix, these plates being rigidly fixed to the seal bar 21 by machine screws 25 and defining arms extending into proximity to the ends of seal bar 22. These members define a frame encircling the matrix 7, which comprises end rings or rims 26 and corrugated sheets 29 extending between the rims and defining passages for radial flow of gas. The matrix may also include rigid spacers extending between and fixed to the rim (not illustrated). Some of the elements of the matrix extend into close proximity to the seal bars 21 and 22 so that a labyrinth seal is provided, minimizing flow along the faces of the matrix from the high pressure to the low pressure side of the diaphragm. Details of the matrix are immaterial to this invention and therefore need not be described.

The end plates 23 are in two sections, a section 31 on the low pressure side of secondary seal 19 and a portion 33 on the high pressure side of seal 19. The cap screws 25 secure both of these portions to the outer seal bar 21. The portions 33 of the end plates mount rollers 34 which roll on the outer surface of the rims 26. The rollers are biased into engagement with the rims by compression springs 35 engaging an abutment in the housing 5. These rollers locate the primary seal radially of the matrix. It is located circumferentially of the matrix by a roller 37 mounted on each end plate portion 33 which extends into a slot 38 in the diaphragm or a cover plate 39 put on to enclose the primary and secondary seals. The slot 38, as can be seen in FIGURE 1, is directed radially of the matrix.

Figure 2:
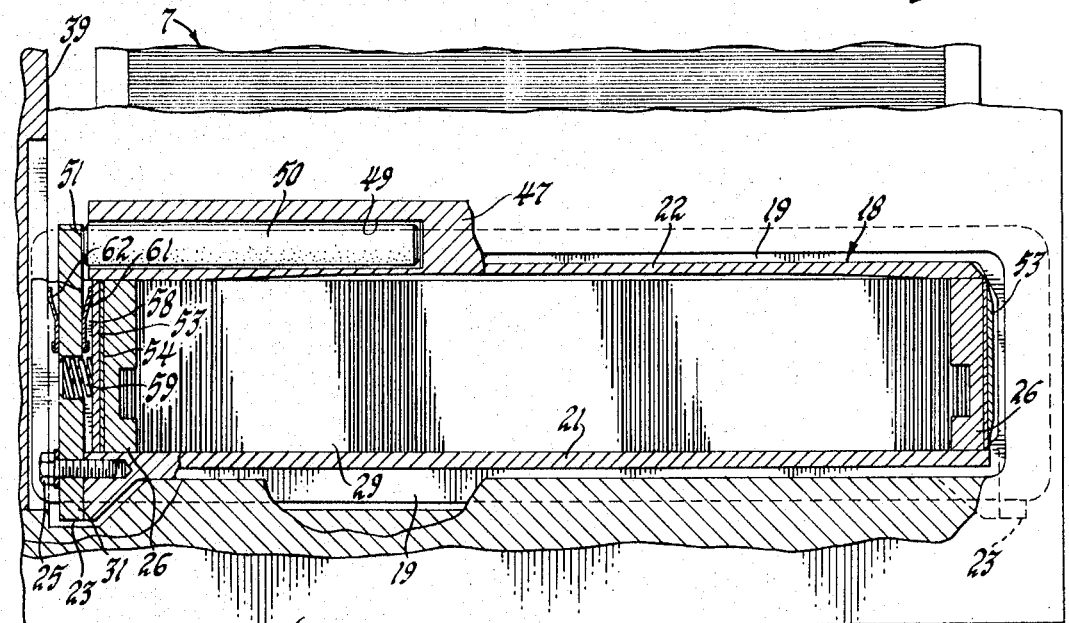
FIGURE 2 is a partial sectional view to a larger scale taken on the plane indicated by the line 2—2 in FIGURE 1.
Figure 3:
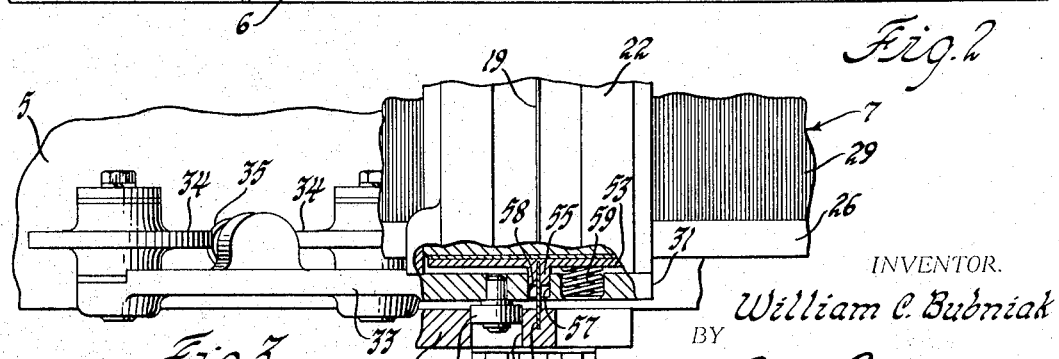
FIGURE 3 is a fragmentary view taken radially of the matrix on the plane indicated by the line 3—3 in FIGURE 1.

The inner seal bar 22 is located with respect to the end plates 23 and the outer seal bar by pins 41 and 42 extending from each end of the bar and received in notches in the end plates. Pin 41 bottoms against a notch in the lateral face of a projection 43 of the portion 33 and pin 42 has some freedom for travel circumferentially of the matrix in a slot 45 in the other portion of the end plate. Since the space 14 is at high pressure relative to space 16, there is no opportunity for the pins to come out of the notches. The secondary seal 19 also prevents detachment of the inner seal bar when the engine is not running. The inner surface of seal bar 22 has a complex curvature to conform to the surface of the matrix when it is hot and the outer seal bar 21 has a cylindrical surface conforming to the matrix when it is cold, as described in U.S. Patent No. 2,888,248 of Bubniak et al. for Rotary Regenerator Seal, issued May 26, 1959. When the inner seal bar 22 heats, it bears against the end plate 23 and causes seal bar 21 to bow radially inwardly as in the patent. In this case, however, the structure of the inner or hot side seal bar 22 comprises a body 47 having a bore 49 parallel to the matrix axis within which is a rod 50 of any suitable low thermal expansion ceramic material. The right end of body 47 as depicted in FIGURE 2 bears against the right side end plate 23 and the rod 50, which projects slightly from the bore 49, bears at 51 against the portion 33 of the end plate 23. The over-all coefficient of expansion of the seal bar 22 may be varied by varying the material of the rod or by varying the relative length of the rod with respect to the over-all length of the seal bar. This seal bar improvement is the subject of my copending application Serial No. 476,425 for Rotary Regenerator Seal, filed August 2, 1965. This flexibility in design makes it possible to select the most suitable material for the seal bar and adjust the expansion to suit the requirements. In a preferred embodiment, the outer seal bar is of a low expansion 38 percent nickel iron alloy and the inner seal bar is made of Ni-resist ductile iron and the rod 50 may be from approximately one-third to over one-half of the total length of the seal bar. Also, if desired, a bore 49 and rod 50 may be provided at each end of seal bar 22.

The rims 26 of the matrix are engaged by end blocks 53, which are preferably metal plates with a suitable anti-friction high temperature resistant facing 54 bearing against the face of the matrix rim. The end block also includes a flange 55 which is received in a slot defined by the faces 57 and 58 of the portions 31 and 33 of the end plate. The flange 55 is mounted sufficiently loosely that the end block can slide to or from the end plate as required by shifting or expansion of the matrix. The end block is biased into contact with the matrix by a compression spring 59 received in a socket in the portion 31.

The rectangular secondary seal 19 of thin sheet metal extends through a narrow gap between the portions 31 and 33 and into a saw cut extending longitudinally of flange 55. It also extends across the outer margins of the seal bars 21 and 22 and correspondingly into saw cuts in the structure of the bulkhead surrounding the main seal, including the bulkhead 6 and the cover plate 39. The pressure difference biases the shim stock against the low pressure side of the saw cuts. Radial or sideways movement of the primary seal is permitted by an excess of depth of the saw cuts. Since the secondary seal 19 extends into the end blocks 53, it serves to seal against gas bypassing circumferentially of matrix past both the inside and outside surfaces of the end plates 23.

There is a relatively slight pressure difference radially of the matrix because of the slight resistance to flow of gas through the matrix. For this reason, each of the end plate portions 31 and 33 bears an internal seal 61 bearing against the end block 53 and an external seal 62 bearing against the structure of the bulkhead or cover plate 39. These seals are rectangular leaf springs spot-welded to the faces of the portions 31 and 33, as shown in FIGURES 1 and 2. They fit closely against the end block and against the adjacent structure of the bulkhead or cover plate to substantially prevent radial flow through or past the main seal bypassing the heat exchange material 29.

It will be clear to those skilled in the art from the foregoing description that the main seal according to the invention is an improvement over those of the prior art referred to, adapted to provide more complete sealing and thus improve the efficiency of an engine in which the regenerator is included.

The detailed description of the preferred embodiment of the invention for the purpose of explaining the principles thereof is not to be considered as limiting or restricting the invention, since many modifications may be made by the exercise of skill in the art.

I claim:
1. A rotary regenerator comprising, in combination,
    a housing
    a diaphragm dividing the interior of the housing into first and second chambers
    an annular matrix rotatably supported in the housing and passing through the diaphragm
    main seals mounted in the diaphragm sealing against the matrix where it passes through the diaphragm
    each main seal comprising a primary seal movably mounted in the diaphragm and encircling the matrix and including
    a substantially rigid frame
    an end seal block displaceable in the frame, and
    means biasing the end seal block against the matrix
    and comprising a yieldable secondary seal between the primary seal and the diaphragm extending through the primary seal frame into the end seal block, thus bridging the gap between the end seal block and the diaphragm.

2. A rotary regenerator comprising, in combination,
    a housing
    a diaphragm dividing the interior of the housing into first and second chambers
    an annular matrix rotatably supported in the housing and passing through the diaphragm
    main seals mounted in the diaphragm sealing against the matrix where it passes through the diaphragm
    each main seal comprising a primary seal movably mounted in the diaphragm and encircling the matrix and including
    a substantially rigid frame
    an end seal block displaceable in the frame, and
    means biasing the end seal block against the matrix
    and comprising a yieldable secondary seal between the primary seal and the diaphragm comprising a flexible plate encircling the seal frame extending into a circumferential slot in the seal frame and a circumferential slot in the diaphragm and through the primary seal frame into a slot in the end seal block, thus bridging the gap between the end seal block and the diaphragm.

References Cited by the Examiner
UNITED STATES PATENTS

| 2,743,945 | 5/1956 | Bentele et al. | 165—9 X |
| 2,888,248 | 5/1959 | Bubniak et al. | 165—9 |
| 3,057,604 | 10/1962 | Bubniak et al. | 165—9 |

ROBERT A. O'LEARY, *Primary Examiner.*

A. W. DAVIS, *Assistant Examiner.*